United States Patent
Itoh et al.

(10) Patent No.: US 7,764,589 B2
(45) Date of Patent: Jul. 27, 2010

(54) CONFOCAL OPTICAL SYSTEM APERTURE DETECTOR THAT MEASURES A LIGHT QUANTITY BALANCE OF LIGHT RECEIVED TO DETECT A POSITION DISPLACEMENT, AND A CONFOCAL OPTICAL SYSTEM APERTURE POSITION CONTROLLER, AN OPTICAL HEAD AND A POSITION DETECTING METHOD PERFORMING THE SAME

(75) Inventors: Tatsuo Itoh, Osaka (JP); Teruhiro Shiono, Osaka (JP); Seiji Nishino, Osaka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 10/595,995

(22) PCT Filed: Apr. 20, 2005

(86) PCT No.: PCT/JP2005/007541

§ 371 (c)(1),
(2), (4) Date: May 24, 2006

(87) PCT Pub. No.: WO2005/104111

PCT Pub. Date: Nov. 3, 2005

(65) Prior Publication Data

US 2008/0316898 A1    Dec. 25, 2008

(30) Foreign Application Priority Data

Apr. 21, 2004    (JP)    ............................ 2004-125194

(51) Int. Cl.
  *G11B 7/00*    (2006.01)
(52) U.S. Cl. .................... 369/118; 369/44.24; 369/112
(58) Field of Classification Search ................ 369/112, 369/112.29, 118, 44.23, 44.24
See application file for complete search history.

(56) References Cited

U.S. PATENT DOCUMENTS 5,471,548 A * 11/1995 Brazas ........................ 385/37

(Continued)

FOREIGN PATENT DOCUMENTS

JP    2624255    4/1997

(Continued)

OTHER PUBLICATIONS

Tadao Tsuruta, Zoku Hikari No Enpitsu (Pencil of Rays, Part II), Shin-gijyutsu communications, 1988, pp. 127-130.

*Primary Examiner*—Thuy N Pardo
(74) *Attorney, Agent, or Firm*—Wenderoth, Lind & Ponack, L.L.P.

(57) ABSTRACT

In a confocal optical system having a light source 13, a first focusing means 14, a second focusing means 16, an aperture 17, and a detector 18 including a plurality of light reception regions, a position displacement is detected by detecting an intensity distribution of an image caused by a position displacement between a focusing spot of the second focusing means 16 and the aperture 17, by the detector 18. Further, the position displacement is corrected by controlling the aperture position using driving means 19 and control means 20. Also, a position displacement of the aperture 17 in the optical axis direction is detected and corrected on the basis of a change in an output of the detector 18 by oscillating the aperture 17 in the optical axis direction.

19 Claims, 9 Drawing Sheets

U.S. PATENT DOCUMENTS

| | | | |
|---|---|---|---|
| 5,657,305 A * | 8/1997 | Sasaki et al. | 369/112.19 |
| 5,708,648 A * | 1/1998 | Ohba | 369/118 |
| 5,748,601 A * | 5/1998 | Takahashi | 369/44.23 |
| 6,111,842 A * | 8/2000 | Nishino et al. | 369/118 |
| 6,392,977 B2 * | 5/2002 | Ando et al. | 369/112.01 |
| 6,560,189 B2 * | 5/2003 | Aoyama et al. | 369/112.29 |
| 6,901,036 B2 * | 5/2005 | Tominaga et al. | 369/44.24 |
| 7,403,454 B2 * | 7/2008 | Nishi | 369/44.32 |

FOREIGN PATENT DOCUMENTS

| | | |
|---|---|---|
| JP | 2625330 | 4/1997 |
| JP | 2000-242963 | 9/2000 |
| JP | 2003-99975 | 4/2003 |

\* cited by examiner

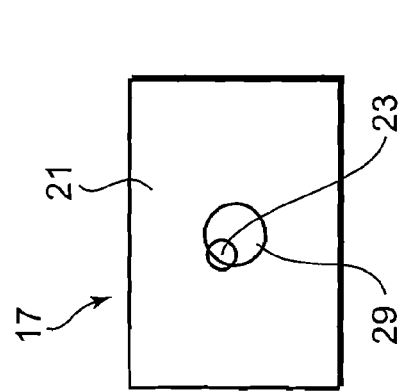
FIG.5A
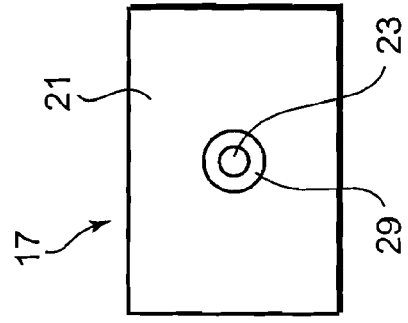
FIG.5B
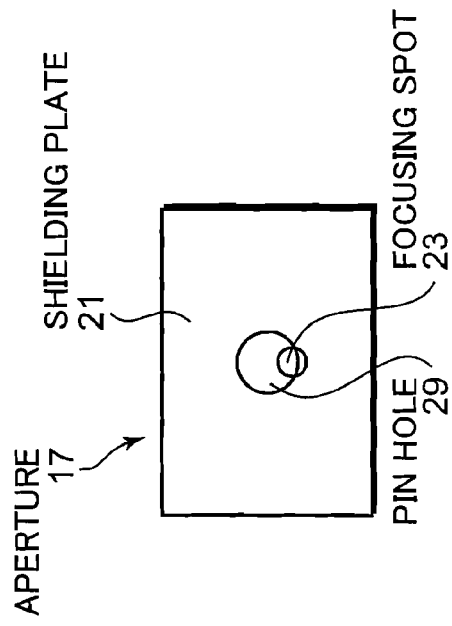
FIG.5C
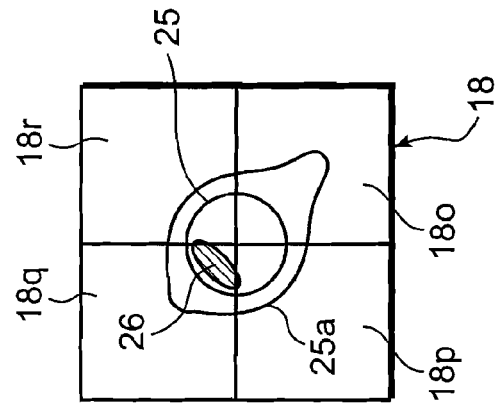
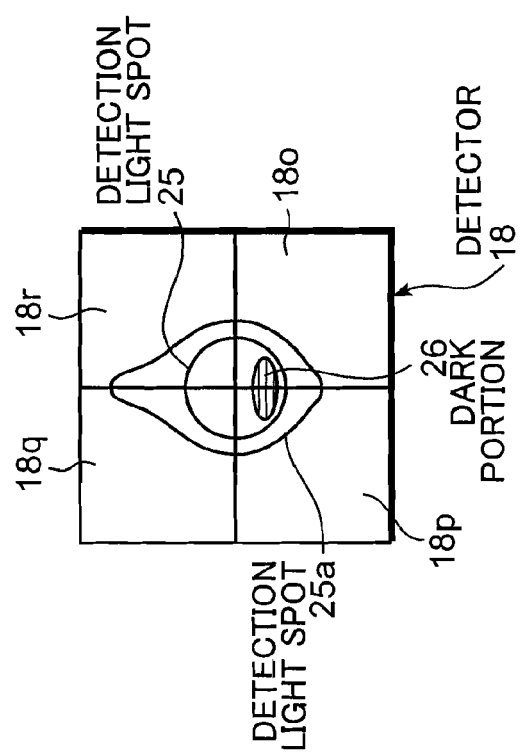

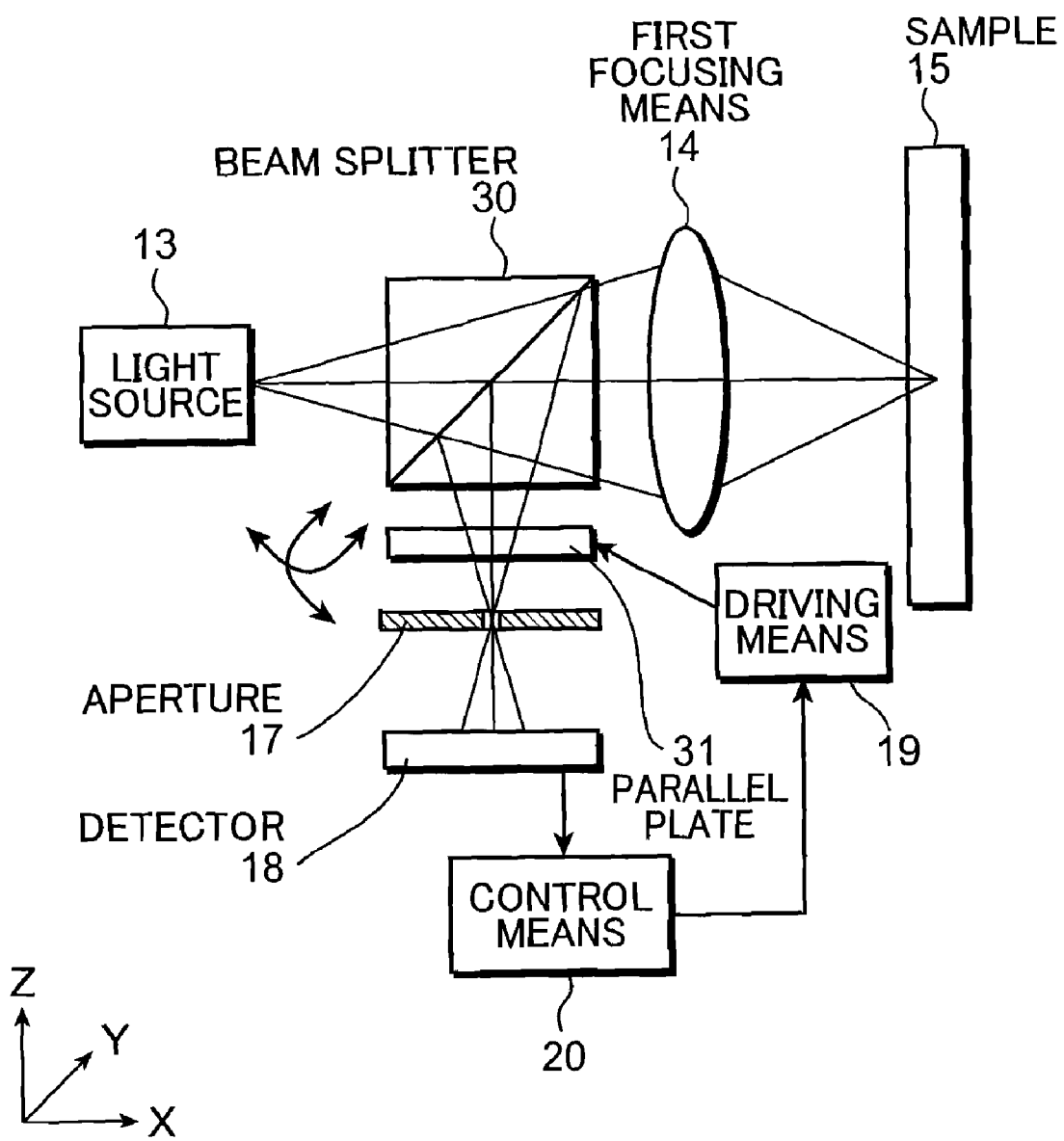

CONFOCAL OPTICAL SYSTEM APERTURE DETECTOR THAT MEASURES A LIGHT QUANTITY BALANCE OF LIGHT RECEIVED TO DETECT A POSITION DISPLACEMENT, AND A CONFOCAL OPTICAL SYSTEM APERTURE POSITION CONTROLLER, AN OPTICAL HEAD AND A POSITION DETECTING METHOD PERFORMING THE SAME

TECHNICAL FIELD

The present invention relates to a confocal optical system suitable to an optical information processor that records/plays back information in/from an optical medium or a magneto optical medium, such as an optical disc and an optical card, or erases the information, and more particularly to a multi-layer optical information processor using an optical recording medium (for example, a multi-layer optical disc or a multi-layer optical card) formed by layering plural information layers, an optical head and a multi-layer optical information processor using the same, and an aperture position detecting method used in the optical information processor.

BACKGROUND ART

In order to increase a recording capacity of an optical disc, the wavelength of the light source is becoming shorter and the numerical aperture (hereinafter, abbreviated as NA) of the objective lens is becoming larger. For a DVD disc, the light source wavelength and the NA of the objective lens are now 650 nm and 0.6, respectively; however, in an optical system proposed for an optical disc in the next generation, the light source wavelength and the NA of the objective lens are 405 nm and 0.85, respectively. In order to further increase the capacity, a multi-layer optical disc formed by laminating a number of information layers in the thickness direction of the optical disc at predetermined intervals is currently under development.

A problem with a multi-layer optical disc is an inter-layer cross talk arising during the playback as a signal from another layer leaks in a signal from the information layer being played back. To solve this problem, an optical head that removes reflected light from the information layers other than the layer being played back using a confocal optical system has been proposed (for example, see Patent Document 1). It is crucial for the confocal optical system to adjust and control the position of the pin hole at the conjugate position with the light source. Patent Document 1, however, is silent about the adjustment and the control of the position of the pin hole.

Patent Document 2 discloses a method and an apparatus for controlling the position of the pin hole using an image of the pin hole on the light source side and an image of the pin hole on the detector side. FIG. 9 is a view showing the confocal optical system in the related art described in Patent Document 2. Referring to FIG. 9, numeral 1 denotes a first light source, numeral 2 denotes a pin hole on the light source side, alpha-numerals 3a through 3e denote lenses, alpha-numerals 4a through 4c denote beam splitters, numeral 6 denotes a sample, numeral 7 denotes a pin hole on the detector side, numeral 8 denotes a detector, numeral 9 denotes a second light source, numeral 10 denotes a position detector, numeral 11 denotes a control means, and numeral 12 denotes a biaxial stage.

When the first light source 1 is lit ON, the image of the pin hole 2 on the light source side is projected onto the position detector 10 by light having passed by the lens 3a, the beam splitters 4b and 4c, and the lens 3e. When the second light source 9 is lit ON, the image of the pin hole 7 on the detector side is projected onto the position detector 10 by light having passed by the lens 3d, the beam splitters 4a, 4b, and 4c, and the lens 3e. The control means 11 controls the biaxial stage 12 for the lens 3c to move slightly within a plane perpendicular to the optical axis, so that position of the image of the pin hole 2 on the light source side and the position of the image of the pin hole 7 on the detector side coincide with each other on the position detector 10. It is thus possible to bring the pin hole 2 on the light source side and the pin hole 7 on the detector side into a conjugate relation.

The configuration in the related art, however, requires the second light source 9, the lens 3d, and the beam splitter 4a to form the image of the pin hole 7 on the detector side. This raises a problem that the device is increased in size and so is the cost.

Patent Document 1: Japanese Patent No. 2624255
Patent Document 2: Japanese Patent NO. 2625330

DISCLOSURE OF THE INVENTION

The invention is to solve the problems in the related art discussed above, and therefore has an object to provide compact and inexpensive confocal optical system aperture position detector and confocal optical system aperture position controller, and an optical head and an optical information processor using these detector and controller.

To achieve the above and other objects, a confocal optical system aperture position detector according to one aspect of the invention preferably includes: a light source; first focusing means for focusing light exiting from the light source onto a sample; second focusing means for focusing light having passed through the sample or light reflected on the sample; an aperture provided at a focusing point position of the second focusing means; and a detector that receives light having passed by the aperture at plural light reception regions.

According to this aspect, the first focusing means focuses light exiting from the light source onto the sample. Light thus focused passes through the sample and is then focused at the aperture position by passing through the second focusing means. Alternatively, light focused by the first focusing means is reflected on the sample in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region. This configuration eliminates the need to include more than one light source, lens, and so forth. A compact and inexpensive confocal optical system aperture position detector can be thus achieved.

Also, to achieve the above and other objects, a confocal optical system aperture position controller according to another aspect of the invention preferably includes: a light source; first focusing means for focusing light exiting from the light source onto a sample; second focusing means for focusing light having passed through the sample or light reflected on the sample; an aperture provided at a focusing point position of the second focusing means; a detector that receives light having passed by the aperture at plural light reception regions; driving means for driving an optical member, which is any one of the light source, the second focusing means, and the aperture, within a plane perpendicular to a local optical axis accompanying the optical member; and control means for controlling the driving means on the basis of a quantity of light received at each of the plural light reception regions of the detector.

According to this aspect, the first focusing means focuses light exiting from the light source onto the sample. Light thus focused passes through the sample and is then focused at the aperture position by passing through the second focusing means. Alternatively, light focused by the first focusing means is reflected on the sample in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. The control means controls the driving means on the basis of a light quantity balance that indicates a magnitude relation of a quantity of light received at each light reception region. In either case, the need to include more than one light source and the like can be eliminated. The confocal optical system aperture position controller is thus compact and inexpensive, and yet capable of adjusting effectively the position of light that passes by the aperture.

Also, to achieve the above and other objects, an optical head according to still another aspect of the invention preferably includes: a light source; first focusing means for focusing light exiting from the light source onto an intended information layer in an optical recording medium formed by layering plural information layers; first driving means for driving the first focusing means within a plane perpendicular to an optical axis of light that passes through the first focusing means; second focusing means for focusing reflected light or transmitted light from the intended information layer; an aperture provided at a focusing point position of the second focusing means; a detector that receives light having passed by the aperture at plural light reception regions; second driving means for driving an optical member, which is any one of the light source, the second focusing means, and the aperture, within a plane perpendicular to a local optical axis accompanying the optical member; and control means for controlling the second driving means on the basis of a quantity of light received at each of the plural light reception regions of the detector.

According to this aspect, the first focusing means focuses light exiting from the light source onto an intended information layer in the optical recording medium. In this instance, the first driving means drives the first focusing means to focus light at a desired position within the information layer. Light thus focused passes through the optical recording medium and is then focused at the aperture position by passing through the second focusing means. Alternatively, light focused by the first focusing means is reflected on the optical recording medium in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region.

The control means controls the second driving means on the basis of the light quantity balance. In other words, the control means controls the second driving means so that a quantity of light received by the detector at each light reception region becomes equal. It is thus possible to adjust light that passes through the aperture to pass by the center of the aperture. As has been described, because the need to include more than one light source and the like is eliminated, the optical head according to an invention of the present application is compact and inexpensive, and yet capable of adjusting effectively the position of light that passes by the aperture.

Also, to achieve the above and other objects, a confocal optical system aperture position detecting method according to still another aspect of the invention preferably includes: a first focusing step of focusing light exiting from a light source onto a sample; a second focusing step of focusing light having passed through the sample or light reflected on the sample; a light detecting step of receiving light having passed by an aperture provided at a focusing point position in the second focusing step at plural light reception regions; and a position detecting step of detecting a position displacement between the light and the aperture by detecting a position of a dark portion which is a region where luminance is lower than its surroundings in the light reception regions and generated when part of light focused in the second focusing step is shielded by the aperture while the light passes by the aperture in the light detecting step.

According to this aspect, light exiting from the light source is focused onto the sample, for example, an optical recording medium, in the first focusing step. Light thus focused passes through the sample and is then focused at the aperture position in the second focusing step. Alternatively, light focused in the first focusing step is reflected on the sample in a specific direction and is then focused at the aperture position in the second focusing step. In either case, light having passed by the aperture is received at the plural light reception regions. Because light having passed by the aperture is received at the plural light reception regions separately in the light detecting step, it is possible to calculate a quantity of light received at each light reception region. In this aspect, the position of a dark portion generated on the light reception region as part of the light is shielded by the aperture is detected in the position detecting step. In this position detecting step, the position of the dark portion is detected on the basis of a light quantity balance that indicates a magnitude relation of a quantity of light received at each light reception region. It is thus possible to efficiently detect a 2-D position of light that passes by the aperture.

BRIEF DESCRIPTION OF THE DRAWINGS

FIGS. 5A to 5C are views showing a position displacement between an aperture and a focusing spot and an image on a detector in a second embodiment of the invention.

FIG. 6 is a view showing the configuration of a confocal optical system aperture position controller according to a third embodiment of the invention.

DETAILED DESCRIPTION OF THE INVENTION

Hereinafter, embodiments of the invention will be described with reference to the drawings.

FIRST EMBODIMENT

Figure 1:
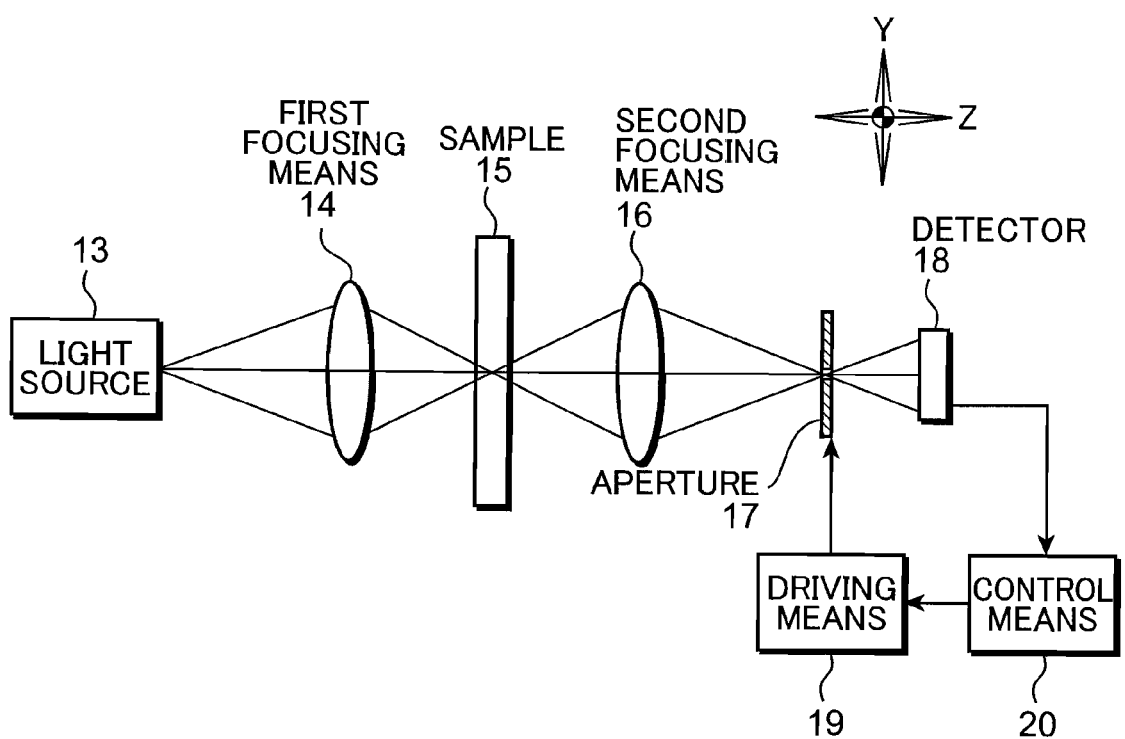
FIG. 1 is a view showing the configuration of a confocal optical system aperture position controller according to a first embodiment of the invention.

FIG. 1 is a view showing the configuration of a confocal optical system aperture position controller according to a first embodiment of the invention. Referring to FIG. 1, numeral 13 denotes a light source, which is preferably a semiconductor laser. Numeral 14 denotes a first focusing means and a lens is preferably used. Numeral 15 denotes a sample. Numeral 16 denotes a second focusing means, which is preferably a lens. Numeral 17 denotes an aperture provided at the focusing point position of the second focusing means 16. Numeral 18 denotes a detector that detects light having passed by the aperture 17. An imaging device, such as a photo diode, a CCD, and a CMOS, can be used as the detector 18. Numeral 19 denotes a driving means that moves the aperture 17 in a 3-D direction. A control means 20 controls the driving means 19 according to a signal from the detector 18.

Light exiting from the light source 13 is focused within the sample 15 by the first focusing means 14. Light having passed through the sample 15 is then focused again by the second focusing means 16 and passes by the aperture 17 provided at the focusing point position. Light having passed by the aperture 17 is detected by the detector 18.

Figure 2:
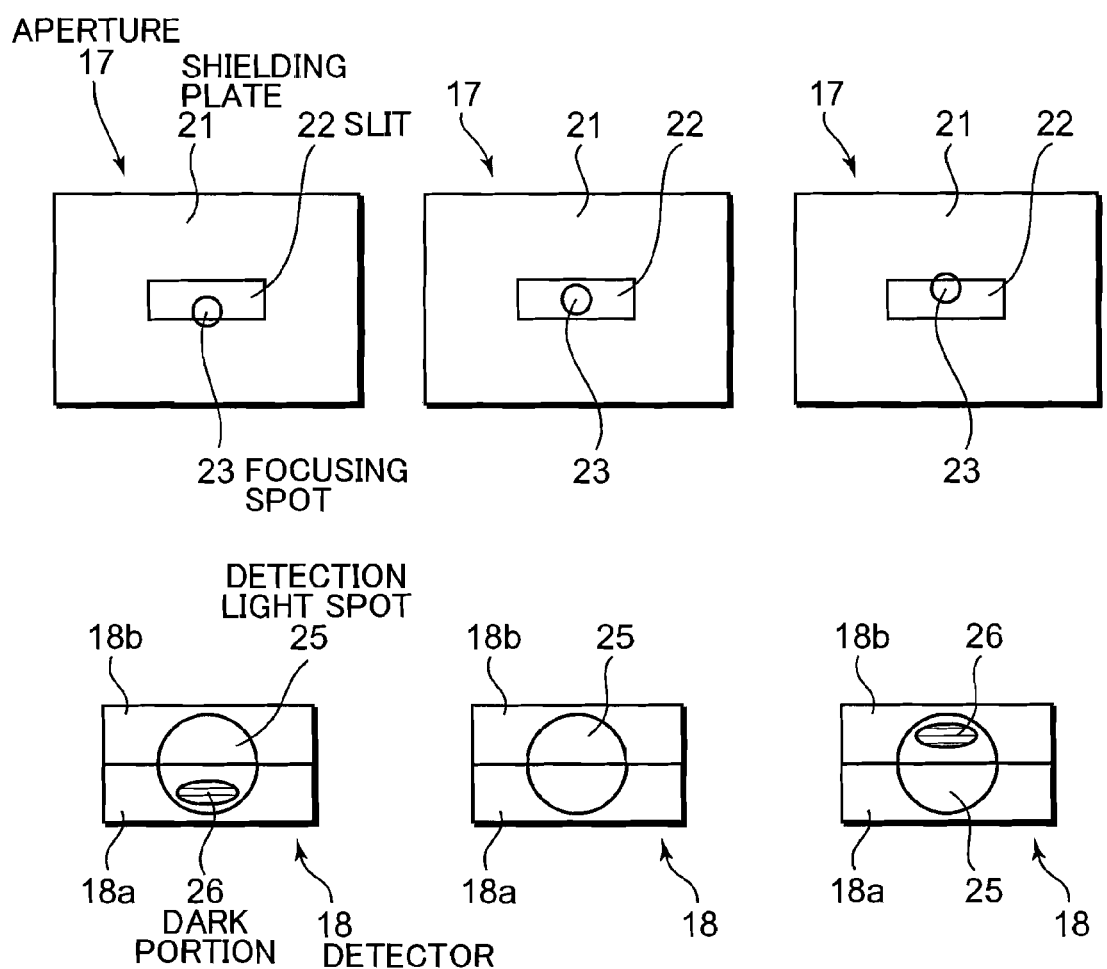
FIGS. 2A to 2C are views showing a position displacement between an aperture and a focusing spot and an image on a detector in the first embodiment of the invention.

An image detected by the detector 18 will now be described using FIGS. 2A to 2C and FIG. 3. Referring to FIGS. 2A to 2C, numeral 21 denotes a shielding plate and numeral 22 denotes a slit made in the shielding plate 21. The shielding plate 21 and the slit 22 together form the aperture 17. Numeral 23 denotes a focusing spot focused by the second focusing means 16, and an airy disc alone is shown herein. The slit 22 is of a size that is about one to two times as large as the airy disc diameter of the focusing spot 23 in one direction (the vertical direction in the drawing) and sufficiently large in comparison with the focusing spot 23 in the other direction (the horizontal direction in the drawing).

The detector 18 comprises two light reception regions 18a and 18b, and the dividing line of the light reception regions 18a and 18b is provided to be parallel to the longitudinal direction of the slit 22. Numeral 23 denotes a detection light spot, which is the focusing spot 23 expanded on the detector 18. Numeral 26 denotes a dark portion, which is a portion within the detection light spot 23 having a smaller quantity of light than its surroundings.

FIG. 2A shows a state where the focusing spot 23 is displaced from the slit 22 in a downward direction. In this instance, the dark portion 26 is generated on the detector 18 on the light reception region 18a side. Meanwhile, FIG. 2B shows a case where the focusing spot 23 is positioned right at the center of the slit 22. In this instance, no dark portion is generated within the detection light spot 25. FIG. 2C shows a state where the focusing spot 23 is displaced from the slit 22 in an upward direction. In this instance, the dark portion 26 is generated on the detector 18 on the light reception region 18b side. Hence, by measuring a light quantity balance of the light reception regions 18a and 18b, it is possible to judge a position displacement between the focusing spot 23 and the slit 22 and the direction of the position displacement.

Figure 3:
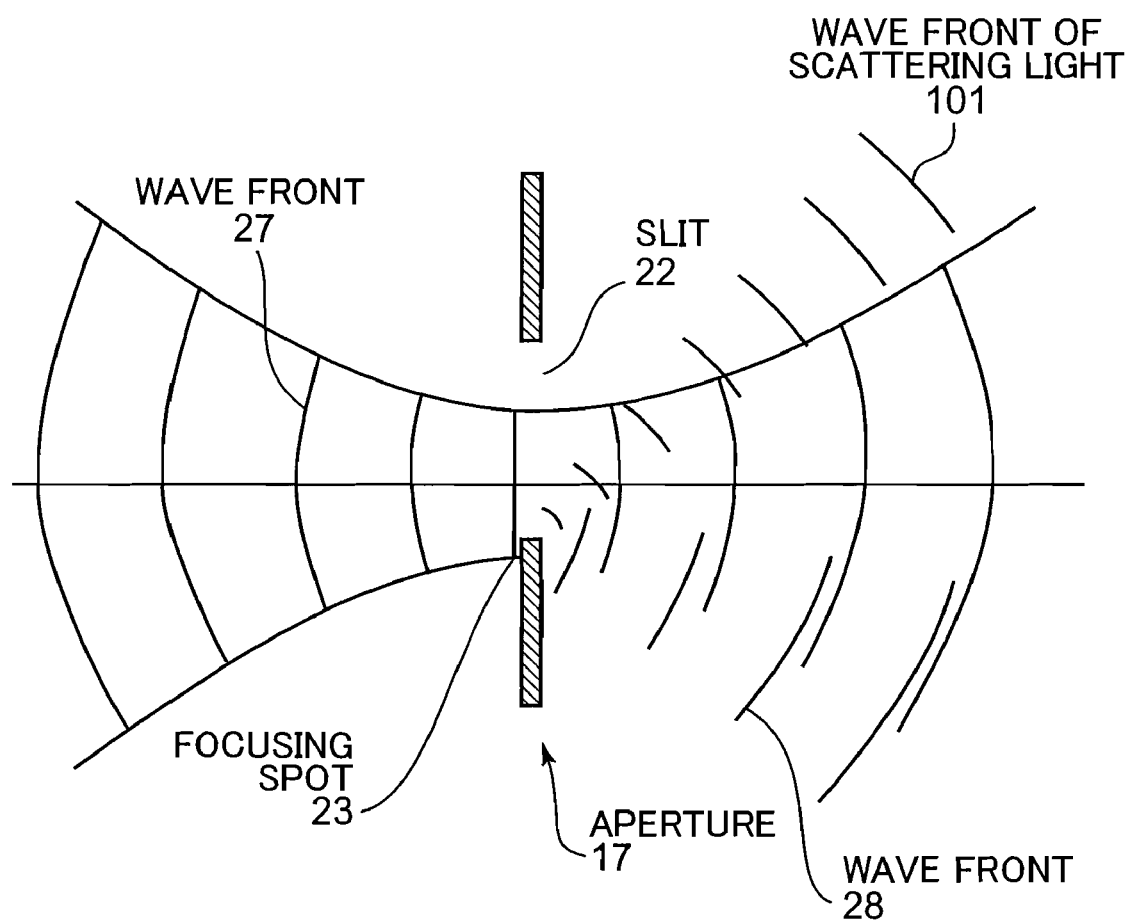
FIG. 3 is a view showing the aperture and the focusing spot cut along the cross section including the optical axis in the first embodiment of the invention.

Subsequently, the reason why the dark portion 26 is generated will be described using FIG. 3. FIG. 3 is a view of the aperture 17 and the focusing spot 23 cut along the cross section including the optical axis. Numeral 27 denotes a wave front of light focused by the second focusing means 16. In the drawing, components same as those in FIG. 1 and FIGS. 2A to 2C are labeled with the same reference numerals, and the description of these components is omitted.

Referring to FIG. 3, the focusing spot 23 hits against one edge (the lower one in the drawing) of the slit 22. In short, the drawing shows the situation of FIG. 2A. In this instance, a diffracted wave called a peripheral wave is generated from the edge on which the focusing spot 23 is striking, and travels as is indicated by a wave front 28 (for example, Masao Tsuruta, *Zoku Hikari No Enpitsu* (*Pencil of Light, Part II*), Shin-Gijyutsu Communication, 1988, p. 128). Because the wave front 27 and the wave front 28 have a phase shift, interference occurs on an unillustrated detector, which gives rise to a contrasting interference fringe. The dark portion 26 is the region where this contrasting interference fringe is occurring on the detector. In other words, the dark portion 26 is not uniformly dark in comparison with its surroundings in the detection light spot 25, but it is a region having a contrasting interference fringe inside.

On the other hand, because no peripheral light is generated from the edge (the upper edge in the drawing) on which the focusing spot 23 is not striking, no interference occurs and the detection light spot 25 remains bright. Hence, as is shown in FIG. 2A, the dark portion 26 is generated on the detector 18 on the light reception portion 18a side. Likewise, referring to FIG. 3, in a case where the focusing spot 23 hits against the upper edge of the slit 22 (equivalent to the situation of FIG. 2C), the wave front 28 of the peripheral wave travels upward. Hence, as is shown in FIG. 2C, the dark portion 26 is generated on the detector 18 on the light reception region 18b side. As has been described, the dark portion 26 is generated in a place that varies with the positional relation of the focusing spot 23 and the slit 22.

Also, as is shown in FIG. 3, a scattering wave different from the peripheral wave is further generated from the edge on which the focusing spot 23 is striking, and travels as indicated by a wave front 101. An aperture position detecting method using the scattering wave will be described in detail in a second embodiment below.

Referring to FIG. 1, the control means 20 measures a light quantity balance of the light receiving regions 18a and 18b from an output of the detector 18, and detects a position displacement within a plane perpendicular to the optical axis of the aperture 17. A position displacement can be therefore prevented as the control means 20 controls the driving means 19 to move the aperture 17. Further, an output of the detector 18 varies when the aperture 17 is moved in the optical axis direction by the driving means 19. It is also possible to align the positions of the aperture 17 and the focusing spot 23 in the optical axis direction using this variation of the output.

Figure 4:
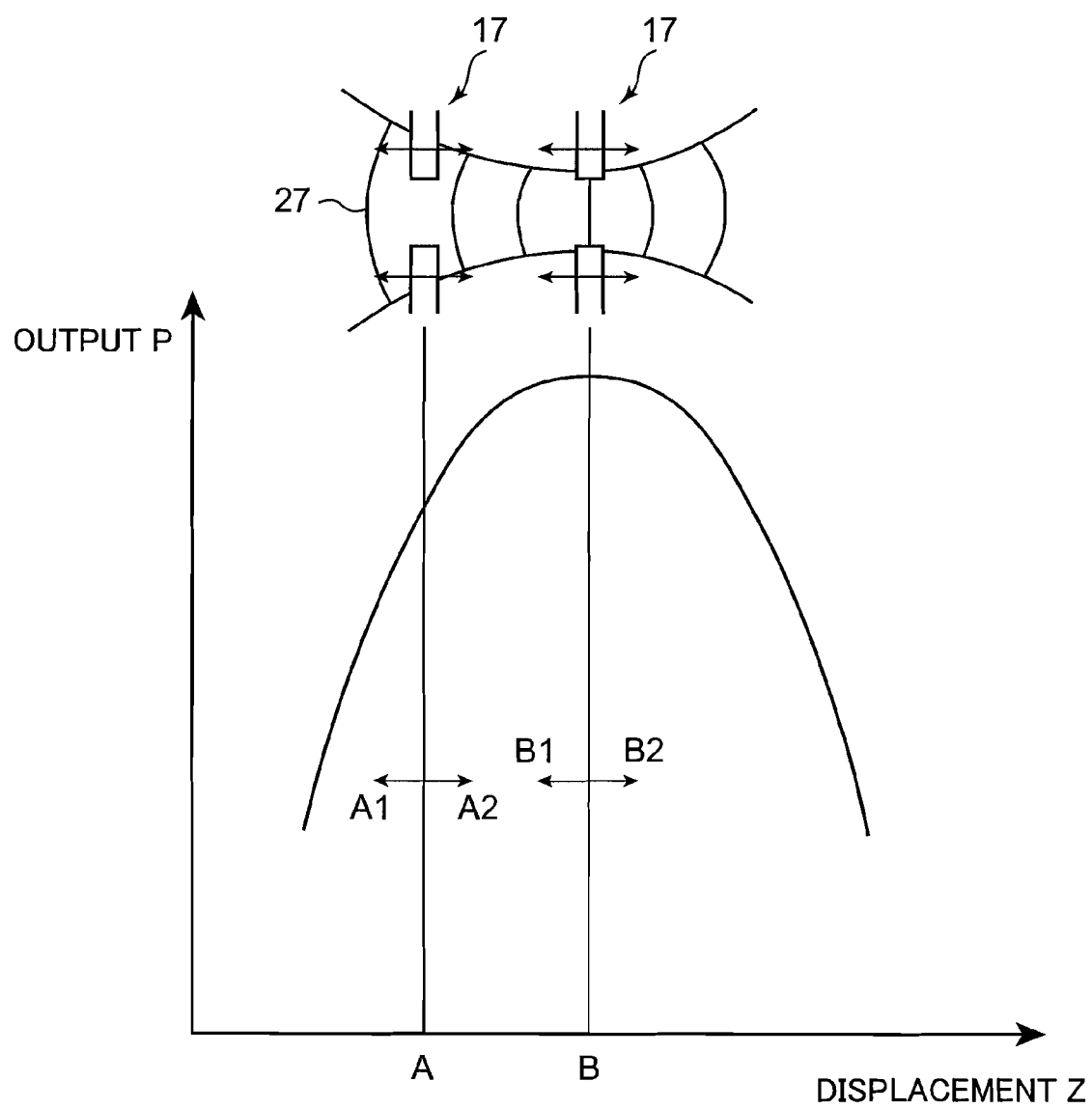
FIG. 4 is a view showing a relation of a displacement of the aperture in the Z direction and an output of the detector in the first embodiment of the invention.

FIG. 4 is a view showing the relation of a displacement of the aperture 17 in the Z direction and an output P of the detector 18. Referring to FIG. 4, in a case where the aperture 17 is at the position A, the output becomes lower at a position A1 and becomes higher at a position A2 by oscillating the aperture 17 between A1 and A2 in the optical axis direction. This is because a quantity of light passing by the aperture 17 is larger at the position A2 than at the position A1 as is shown on the top of FIG. 4. It is therefore understood that the focusing point position of the second focusing means 16 is present in a direction toward A2 from the position A.

Different from the foregoing, in a case where the aperture 17 is at a focusing point position B, the output at a position B1 and the output at a position B2 are equal even when the aperture 17 is oscillated between B1 and B2 in the optical axis direction in the same amplitude. It is therefore understood that the position of the aperture 17 coincides with the focusing point position of the second focusing means 16. In short, it is understood that the position B is the focusing point position of the second focusing means 16. As has been described, it is possible to detect and correct a position displacement between the aperture 17 and the focusing point of the second focusing means 16 in the optical axis direction by oscillating the aperture 17 in the optical axis direction with the use of the driving means 19. It is sufficient that the driving means 19 is configured to drive the aperture 17 at least in one direction, for example, in a direction from B1 to B2 or conversely, in a direction from B2 to B1, instead of oscillating the aperture 17. It is possible to detect and correct a position displacement between the aperture 17 and the focusing point of the second focusing means 16 in the optical axis direction in this case, too.

According to the configuration as above, it is possible to detect a position displacement between the aperture 17 and the focusing point by providing the detector 18 having more than one light reception region. Also, it is possible to correct a position displacement between the aperture 17 and the focusing point by providing the driving means 19 that moves the aperture 17 and the control means 20 that controls the driving means 19 according to a signal from the detector 18. Further, it is possible to detect and correct a position displacement between the focusing point and the aperture 17 in the optical axis direction by oscillating the aperture 17 in the optical axis direction with the use of the driving means 19.

In this embodiment, the driving means 19 that moves the aperture 17 within a plane perpendicular to the optical axis may be a voice coil or a mechanical stage that moves the aperture 17 mechanically, or it may move the aperture position electronically by forming the aperture 17 from a liquid crystal shutter.

SECOND EMBODIMENT

FIGS. 5A to 5C are views showing an aperture and a detector in a confocal optical system aperture position controller according to a second embodiment of the invention. Because the confocal optical system aperture position controller according to the second embodiment of the invention is the same as the confocal optical system aperture position controller according to the first embodiment of the invention except for the shape of the aperture and patterns of the detector, such as the number of the divided light reception regions, descriptions will be given using FIGS. 5A to 5C. In FIGS. 5A to 5C, components same as those in FIG. 1 and FIGS. 2A to 2C are labeled with the same reference numerals, and the description of these components is omitted.

Referring to FIGS. 5A to 5C, numeral 29 is a pin hole made in the shielding plate 21. The pin hole 29 is of a size about one to two times as large as the airy disc diameter of the focusing point spot 23. The detector 18 is divided into four regions, and therefore comprises light reception regions 18o, 18p, 18q, and 18r. Referring to FIG. 5A, in a case where the focusing spot 23 is present at the lower end of the pin hole 29, the dark portion is generated in the light reception regions 18o and 18p due to the peripheral wave described with reference to FIG. 3. FIG. 5B shows a state where the focusing spot 23 is concentric with the pin hole 29. In this instance, outputs of the light reception regions 18o, 18p, 18q, and 18r are all equal. FIG. 5C shows a case where the focusing spot 23 is at a position displaced diagonally with respect to the pin hole 29. In this instance, a quantity of light is reduced chiefly in the light reception region 18q. Hence, it is possible to correct a position displacement between the focusing spot 23 and the pin hole 29 by measuring a light quantity balance of the light reception regions 18o, 18p, 18q, and 18r.

In addition, a detection light spot 25a having a smaller quantity of light than the detection light spot 25 is present on the outside of the detection light spot 25 to surround the detection light spot 25. A quantity of light naturally decreases smoothly from the maximum value; however, for ease of descriptions, two cross sections 25 and 25a alone are shown herein as detection light spots equivalent to the cross sections of quantities of light. When viewed in detail, a distribution of a quantity of light is asymmetric in these detection light spots, in particular, the detection light spot 25a. For example, in FIG. 5A, the detection light spot 25a shows an asymmetric pattern that is trailing upward in the drawing. Likewise, in FIG. 5C, the detection light spot 25a is trailing toward the lower right in the drawing. It is thought that these patters are attributed to influences of the scattering light shown in FIG. 3.

Hence, besides the method of detecting a position displacement between the focusing spot 23 and the pin hole 29 by detecting the position of the dark portion 26 as descried above, it is also possible to detect a position displacement by detecting the position of an asymmetric pattern of a quantity of light. For example, in the case of FIG. 5A, quantities of light in the light reception regions 18q and 18r are larger than quantities of light in the light reception regions 18o and 18p. Further, quantities of light are equal in the light reception regions 18o and 18p and in the light reception regions 18q and 18r. It is therefore understood that the focusing spot 23 is displaced to the lower side with respect to the aperture 17 as is shown on the top of FIG. 5A.

Likewise, in the case of FIG. 5C, quantities of light are equal in the light reception regions 18p and 18r. However, a quantity of light in the light reception region 18o is larger, and conversely, a quantity of light in the light reception region 18q is smaller. It is therefore understood that the focusing spot 23 is displaced to the upper left with respect to the aperture 17 as is shown on the top of FIG. 5C.

THIRD EMBODIMENT

FIG. 6 is a view showing the configuration of a confocal optical system aperture position controller according to a third embodiment of the invention. In FIG. 6, components same as those in FIG. 1 are labeled with the same reference numerals, and the description of these components is omitted. Referring to FIG. 6, numeral 30 denotes a beam splitter. Numeral 31 denotes a parallel plate, and comprises, for example, an optically polished glass plate. Numeral 19 denotes a driving means that rotates the parallel plate 31 about the X axis or the Y axis, or about the X axis and the Y axis. Referring to FIG. 6, light exiting from the light source 13 passes through the beam splitter 30 and is focused within the sample 15 by the first focusing means 14. Light reflected on the sample 15 again passes by the first focusing means 14 and is reflected on the beam splitter 30 to be focused on the aperture 17. In short, the first focusing means and the second focusing means are one and the same in the third embodiment. Light having passed by the aperture 17 goes incident on the detector 18.

The focusing point position starts to move in the Y axis direction as the parallel plate 31 provided between the beam splitter 30 and the aperture 17 rotates about the X axis of FIG. 6, and it starts to move in the X axis direction as the parallel plate 31 rotates about the Y axis direction. In this manner, it is possible to align the positions of the aperture 17 and the focusing point position as the driving means 19 rotates the parallel plate 31 under the control of the control means 20. A position displacement is detected in the same manner as described in the first embodiment or the second embodiment above, and the description is omitted herein. According to this configuration, because substantially no position displacement is generated for the focusing point position in the Z axis direction, there is an effect that it is easy to align the position within a plane (X-Y plane in the drawing) perpendicular to the optical axis (Z axis direction in the drawing) of light that comes incident on the aperture 17.

In the third embodiment, the focusing point position is moved slightly with the use of the parallel plate 31. However, it is also possible to slightly move the focusing point position of reflected light from a mirror by rotating the mirror.

FOURTH EMBODIMENT

Figure 7:
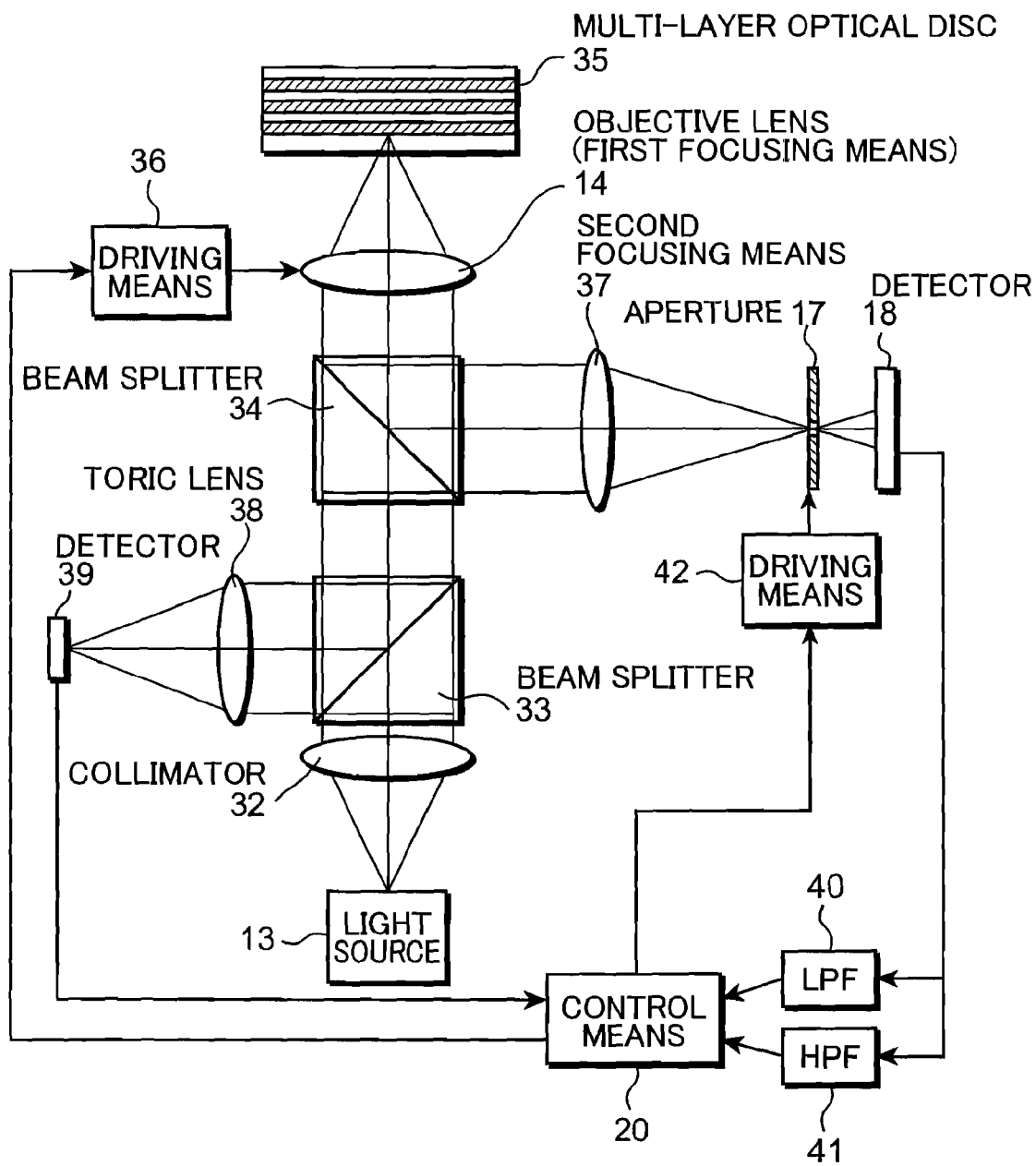
FIG. 7 is a view showing the configuration of an optical head according to a fourth embodiment of the invention.

FIG. 7 is a view showing the configuration of an optical head according to a fourth embodiment of the invention. In FIG. 7, components same as those in FIG. 1 are labeled with the same reference numerals, and the description of these components is omitted. Referring to FIG. 7, numeral 32 denotes a collimator that converts light exiting from the light source 13 to parallel light. Numerals 33 and 34 denote beam splitters. Numeral 14 denotes an objective lens as one embodiment of the first focusing means. Numeral 35 denotes a multi-layer optical disc, which is a multi-layer optical recording medium formed by layering more than one information layer. The multi-layer optical disc 35 is rotated by an unillustrated driving means.

Numeral 36 denotes a driving means that moves the first focusing means (objective lens) 14 in the optical axis direction and within a plane perpendicular to the optical axis direction. A voice coil actuator or the like is suitably used as the driving means 36. Numeral 37 denotes a second focusing means that focuses light from the beam splitter 34 onto the aperture 17. Numeral 39 denotes a detector that detects a servo signal from the multi-layer optical disc 35. Numeral 38 denotes a toric lens that focuses light from the beam splitter 33 onto the detector 39 as light having astigmatism. Numeral 40 denotes a low-pass filter (LPF) that allows only a low frequency component in a signal from the detector 18 to pass. Numeral 41 denotes a high-pass filter (HPF) that allows only a high frequency component in a signal from the detector 18 to pass. Numeral 42 denotes a driving means that drives the aperture 17 in the optical axis direction and in an in-plane direction perpendicular to the optical axis.

Referring to FIG. 7, light exiting from the light source 13 is converted to parallel light by the collimator 32, after which it passes through the beam splitter 33 and the beam splitter 34 and is focused on a desired information layer in the multi-layer optical disc 35 by the first focusing means 14. Light reflected on the multi-layer optical disc 35 again passes through the first focusing means 14, after which part of the light is reflected on the beam splitter 34 and focused on the aperture 17 by the second focusing means 37. Light having passed by the aperture 17 is detected by the detector 18. In this instance, for example, the pin hole and the four divided light reception regions as described in the second embodiment are provided to the aperture 17 and the detector 18, respectively.

Hence, by measuring a light quantity balance of the light reception regions of the detector 18, it is possible to detect a position displacement between the focusing spot and the pin hole.

A signal detected by the detector 18 is separated into a low frequency component at a frequency lower than 1 MHz and a high frequency component at a frequency as high as or higher than 1 MHz by the low-pass filter 40 and the high-pass filter 41, and both are inputted into the control means 20. A signal detected by the detector 18 is separated into a high frequency component at a frequency as high as or higher than 1 MHz, which is a signal from pits recorded in the multi-layer optical disc 35, and a low frequency component at a frequency lower than 1 MHz associated with the occurrence of a position displacement between the aperture 17 and the focusing spot. It is thus possible to align the positions of the focusing spot and the aperture 17 as the control means 20 controls the driving means 42 to move the aperture 17 according to a signal having passed the low-pass filter 40.

On the other hand, a signal recorded in the multi-layer optical disc 35 can be played back from a signal having passed the high-pass filter 41. Also, a tracking signal is generated from a signal having passed the high-pass filter 41 in the control means 20 by the phase difference method known as a tracking error signal detecting method. The control means 20 thus aligns the positions of the multi-layer optical disc 35 and the first focusing means 14 in the tracking direction by controlling the driving means 36 according to this signal.

The alignment of the positions of the multi-layer optical disc 35 and the first focusing means 14 in the optical axis direction, that is, the focus servo, will now be described. Light reflected on the multi-layer optical disc 35 passes through the first focusing means 14, after which part of the light passes through the beam splitter 34 and is reflected on the beam splitter 33. The reflected light is then focused on the detector 39 by the toric lens 38. Because the light focused by the toric lens 38 has astigmatism, the astigmatism method known as a focus error signal detecting method can be used. The control means 20 thus generates a focus error signal by the astigmatism method, and controls the driving means 36 according to this signal to align the multi-layer optical disc 35 and the first focusing means 14 in the optical axis direction.

According to this configuration, it is possible to record/ play back information in/from a desired information layer in the multi-layer optical disc 35 by performing the focus servo and the tracking servo. At the same time, because reflected light from information layers other than the desired one in the multi-layer optical disc 35 is removed with the use of the aperture 17, playback in the absence of an inter-layer cross talk can be achieved. Also, because a position displacement between the focusing point of the second focusing means 37 and the aperture 17 can be corrected, there is an effect that a position displacement will not occur due to a change in ambient temperature. Further, because both a tracking error signal and a signal of the position displacement of the aperture 17 can be detected by the detector 18, there is another effect that the number of components can be reduced.

FIFTH EMBODIMENT

Figure 8:
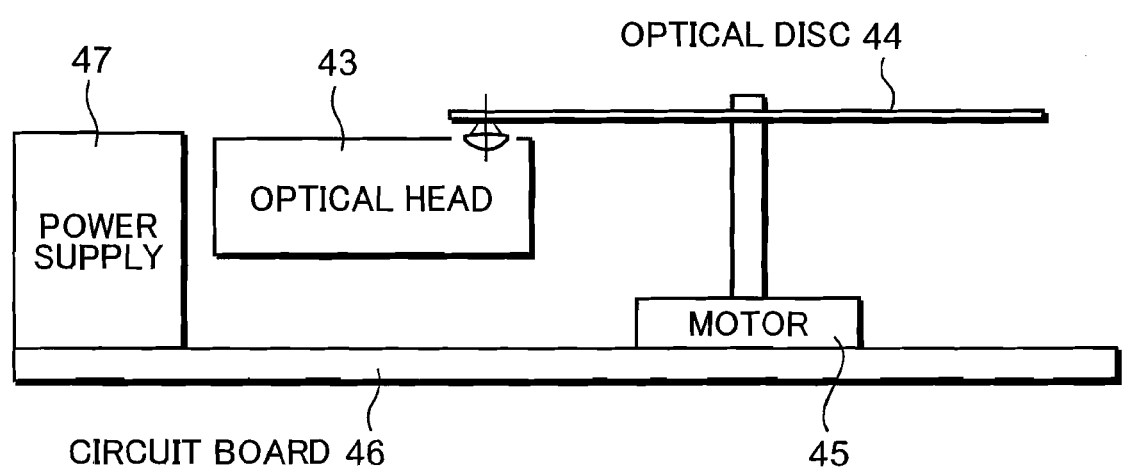
FIG. 8 is a view showing the configuration of an optical information processor according to a fifth embodiment of the invention.
Figure 9:
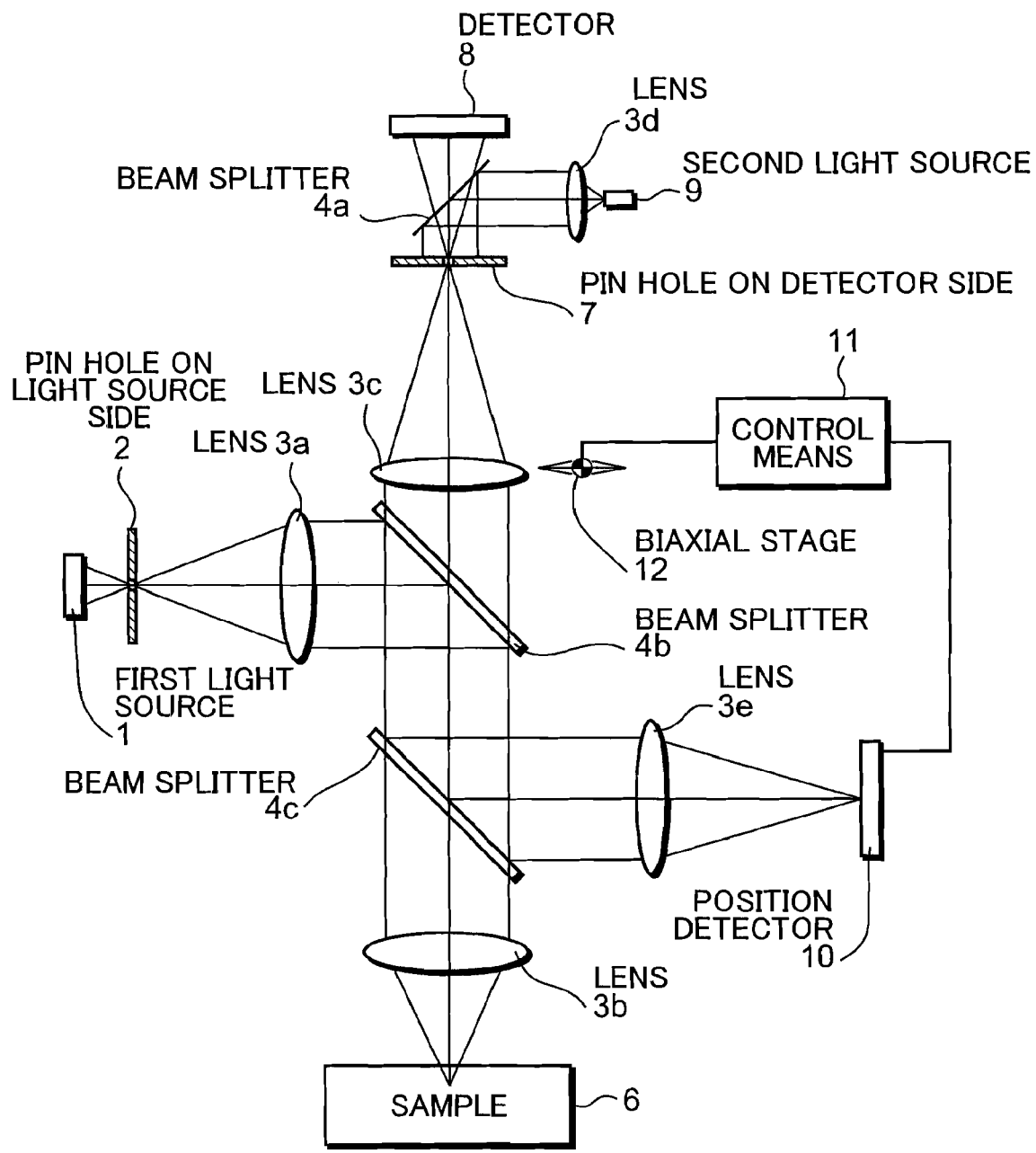
FIG. 9 is a view showing a confocal optical system in the related art.

FIG. 8 is a view showing the configuration of an optical information processor according to a fifth embodiment of the invention. Referring to FIG. 8, numeral 43 denotes the optical head described in the fourth embodiment of the invention, and numeral 44 denotes a multi-layer optical recording medium, which is an optical disc formed by layering more than one information layer. Numeral 45 denotes a motor as a driving mechanism of the optical disc 44 to support and rotate the optical disc 44. Numeral 46 denotes a circuit board, which is an electric circuit used to perform operations, such as reading, writing, or erasing of information, by controlling the focus servo driving mechanism (not shown) and the tracking servo driving mechanism (not shown). Numeral 47 denotes a connection portion to the power supply or the outside power supply, and a voltage is supplied from here to the circuit board 46, the driving mechanism of the optical head 43, the motor 45, and the focusing lens driver. It should be noted that there arises no problem when the connection terminal to the power supply or the outside power supply is provided to each driving circuit.

The optical disc 44 is rotated by the motor 45. The optical head 43 sends a signal corresponding to the positional relation with respect to the optical disc 44 to the circuit board 46. The circuit board 46 then performs computations according to this signal and outputs a signal to slightly move the optical head 43 or the focusing lens within the optical head 43. The optical head 43 or the focusing lens within the optical head 43 performs the focus servo and the tracking servo for the optical disc 44 under the control of the circuit board 46, and thereby reads/writes information from/in the optical disc 44 or erases the information.

The optical information processor formed using the optical head according to one embodiment of the invention has an advantage that not only it achieves a satisfactory playback performance due to a small inter-layer cross talk, but it also remains unsusceptible to a change in ambient temperature.

Summary of the Embodiments

The summary of the embodiments of the invention will be set forth in the following.

(1) As has been described, a confocal optical system aperture position detector according to an invention of the present application preferably includes: a light source; first focusing means for focusing light exiting from the light source onto a sample; second focusing means for focusing light having passed through the sample or light reflected on the sample; an aperture provided at a focusing point position of the second focusing means; and a detector that receives light having passed by the aperture at plural light reception regions.

According to this configuration, the first focusing means focuses light exiting from the light source onto the sample. Light thus focused passes through the sample and is then focused at the aperture position by passing through the second focusing means. Alternatively, light focused by the first focusing means is reflected on the sample in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region. This configuration eliminates the need to include more than one light source, lens, and so forth. A compact and inexpensive confocal optical system aperture position detector can be thus achieved.

(2) A confocal optical system aperture position detector is the confocal optical system aperture position detector set forth in (1) above, wherein it is preferable that the light reception regions of the detector are divided so as to be capable of detecting a 2-D position of light that passes by the aperture.

For example, assume a case where the light reception region is divided into two in the vertical direction and two in the horizontal direction to pass the center of the light reception region, that is, a case where it is divided into four regions in total. In addition, in a case where a quantity of light received at each of the upper two light reception regions is equal, and a quantity of light received at each of the lower two light reception regions is also equal, when the quantities of light received at the upper two light reception regions are larger than the quantities of light received at the lower two light reception regions, then it is understood that light that passes by the aperture is displaced vertically downward with respect to the center of the aperture. Also, for example, of the four divided light reception regions, in a case where a quantity of light received at the light reception region at the upper right is the smallest and quantities of light received at the other three light reception regions are larger than this quantity of light and all equal, it is understood that light that passes by the aperture is displaced to the upper right in the travel direction of the light with respect to the center of the aperture. It is thus possible to detect the 2-D position of light that passes by the aperture by dividing the light reception region of the detector into plural light reception regions as has been described.

The plural light reception regions of the detector are not necessarily four divided light reception regions. The 2-D position of light that passes by the aperture can be detected by dividing the light reception region into at least three regions. A dividing manner is not limited to the manner described above, either, and a dividing direction can be an arbitrary direction. Further, the plural light reception regions of the detector are not necessarily divided to have equal areas. In this case, that is, in a case where the plural light reception regions have different areas, the same effect as in the case of the equally divided light reception regions can be achieved, for example, by multiplying quantities of received light by coefficients corresponding to the areas of the light reception regions.

(3) A confocal optical system aperture position detector is the confocal optical system aperture position detector set forth in (2) above, wherein it is preferable that the aperture has a pin hole and the detector has four divided light reception regions.

In a case where the light reception region of the detector is made of one region, when the magnitude of a displacement of light that passes by the pin hole from the center of the pin hole is equal, a quantity of received light is equal regardless of the direction of the displacement. It is therefore impossible to detect the direction of the displacement. Hence, for example, the light reception region is divided into two in the vertical direction and two in the horizontal direction to pass the center of the light reception region, that is, it is divided into four regions in total. In this case, a 2-D position of light that passes by the pin hole can be detected from a balance of quantities of light received at the four light reception regions. A manner by which the region is divided into four regions is not limited to the manner described above. A dividing direction is not limited to the vertical and horizontal directions, either, and it can be an arbitrary direction. Further, the divided light reception regions may be of different sizes as long as the 2-D position of light that passes by the pin hole can be detected from a balance of quantities of light.

(4) A confocal optical system aperture position detector is the confocal optical system aperture position detector set forth in any one of (1) through (3) above, wherein it is preferable that a material of the aperture is an electrically good conductor (i.e., an electrical conductor).

In a case where light hits against the edge portion of the aperture, it is known that light having passed by the aperture comprises a wave having traveled through the edge portion and a refracted wave called a peripheral wave. When the wave having traveled through the edge portion and the peripheral wave reach the same region, for example, the region on the detector, a contrasting interference fringe occurs due to interference, and this region becomes a dark portion where the luminance is lower than its surroundings. In particular, because the peripheral wave can be generated efficiently when the material of the aperture is an electrically good conductor, the dark portion can be observed more readily. Consequently, for example, a difference of quantities of light detected by the detector becomes noticeable. It is thus possible to detect a relative position displacement between the aperture and light passing by the aperture effectively. The electrically good conductor is not limited to metals, and it can be a semiconductor and the like.

(5) A confocal optical system aperture position detector is the confocal optical system aperture position detector set forth in any one of (1) through (4), wherein it is preferable that the first focusing means and the second focusing means are one and the same.

According to this configuration, the first focusing means focuses light exiting from the light source onto the sample. Light thus focused is reflected on the sample and is then focused at the aperture position by passing through the first focusing means again. In other words, because the first focusing means also plays a role of the second focusing means, not only can the device be compact, but also the manufacturing costs can be saved by reducing the number of components.

(6) As has been described, a confocal optical system aperture position controller according to an invention of the present application preferably includes: a light source; first focusing means for focusing light exiting from the light source onto a sample; second focusing means for focusing light having passed through the sample or light reflected on the sample; an aperture provided at a focusing point position of the second focusing means; a detector that receives light having passed by the aperture at plural light reception regions; driving means for driving an optical member, which is any one of the light source, the second focusing means, and the aperture, within a plane perpendicular to a local optical axis accompanying the optical member; and control means for controlling the driving means on the basis of a quantity of light received at each of the plural light reception regions of the detector.

According to this configuration, the first focusing means focuses light exiting from the light source onto the sample. Light thus focused passes through the sample and is then focused at the aperture position by passing through the second focusing means. Alternatively, light focused by the first focusing means is reflected on the sample in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. The control means controls the driving means on the basis of a light quantity balance that indicates a magnitude relation of a quantity of light received at each light reception region.

For example, assume a case where the light reception region is divided into two in the vertical direction and two in the horizontal direction to pass the center of the light reception region, that is, a case where it is divided into four regions in total. In addition, for example, in a case where a quantity of light received at the light reception region at the upper right is the smallest and quantities of light received at the other three light reception regions are larger than this quantity of light and all equal, it is understood that light that passes by the aperture is displaced to the upper right in the travel direction of the light with respect to the center of the aperture. In this case, for example, the control means drives the aperture alone toward the upper right within a plane perpendicular to the local optical axis accompanying the aperture for the light to pass by the center of the aperture. Likewise, instead of the aperture as one optical member, the driving means may be configured to drive the light source or the second focusing means as another optical member within a plane perpendicular to the local optical axis accompanying the corresponding optical member. The local optical axis accompanying the optical member referred to herein means, in the case of the light source, the optical axis of light immediately after it has exited from the light source. Also, in the case of the aperture or the second focusing member, it means the optical axis of light that passes by or passes through the corresponding optical component.

In either case, the need to include more than one light source and the like can be eliminated. The confocal optical system aperture position controller is thus compact and inexpensive, and yet capable of adjusting effectively the position of light that passes by the aperture.

(7) A confocal optical system aperture position controller is the confocal optical system aperture position controller set forth in (6) above, wherein it is preferable that: the driving means is used as first driving means; the controller further includes second driving means for driving an optical member, which is any one of the light source, the second focusing means, and the aperture, in a direction parallel to a local optical axis accompanying the optical member; and the control means controls the first and second driving means on the basis of the quantity of light received at each of the plural light reception regions of the detector.

According to this configuration, the driving means controls the first driving means to drive the aperture or the light source, or the second focusing means within a plane perpendicular to the local optical axis accompanying the corresponding optical member, and controls the second driving means to drive the aperture or the light source, or the second focusing means in the local optical axis direction accompanying the corresponding optical member. It is thus possible to adjust the positions of the aperture and light that passes by the aperture effectively. In this instance, the control means may oscillate the aperture or the light source, or the second focusing means in a specific one direction instead of driving the corresponding optical member, for example, in one direction.

(8) As has been described, a confocal optical system aperture position controller according to an invention of the present application preferably includes: a light source; first focusing means for focusing light exiting from the light source onto a sample; second focusing means for focusing light having passed through the sample or light reflected on the sample; an aperture provided at a focusing point position of the second focusing means; a detector that receives light having passed by the aperture at plural light reception regions; a parallel plate provided between the second focusing means and the aperture; driving means for tilting the parallel plate with respect to an optical axis of light that passes through the parallel plate; and control means for controlling the driving means on the basis of a quantity of light received at each of the plural light reception regions of the detector.

According to this configuration, the first focusing means focuses light exiting from the light source onto the sample. Light thus focused passes through the sample and is then focused at the aperture position by passing through the second focusing means. Alternatively, light focused by the first focusing means is reflected on the sample in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. The control means controls the driving means on the basis of a light quantity balance that indicates a magnitude relation of a quantity of light received at each light reception region.

For example, assume a case where the light reception region is divided into two in the vertical direction and two in the horizontal direction to pass the center of the light reception region, that is, a case where it is divided into four regions in total. In addition, for example, in a case where a quantity of light received at the light reception region at the upper right is the smallest and quantities of light received at the other three light reception regions are larger than this quantity of light and all equal, it is understood that light that passes by the aperture is displaced to the upper right in the travel direction of the light with respect to the center of the aperture. In this case, the control means rotates the parallel plate about an axis in the vertical direction passing the center of the parallel plate and about an axis in the horizontal direction passing the center of the parallel plate by a specific angle. Light having passed through the parallel plate is thus controlled to pass by the center of the aperture. As has been described, the need to include more than one light source and the like can be eliminated. The confocal optical system aperture position controller is thus compact and inexpensive, and yet capable of adjusting effectively the position of light that passes by the aperture.

(9) A confocal optical system aperture position controller is the confocal optical system aperture position controller set forth in any one of (6) through (8), wherein it is preferable that the first focusing means and the second focusing means are one and the same.

According to this configuration, the first focusing means focuses light exiting from the light source onto the sample. Light thus focused is then reflected on the sample and is then focused at the aperture position by passing through the first focusing means again. In other words, because the first focusing means also plays a role of the second focusing means, not only can the device be compact, but also the manufacturing costs can be saved by reducing the number of components.

(10) As has been described, an optical head according to an invention of the present application preferably includes: a light source; first focusing means for focusing light exiting from the light source onto an intended information layer in an optical recording medium formed by layering plural information layers; first driving means for driving the first focusing means within a plane perpendicular to an optical axis of light that passes through the first focusing means; second focusing means for focusing reflected light or transmitted light from the intended information layer; an aperture provided at a focusing point position of the second focusing means; a detector that receives light having passed by the aperture at plural light reception regions; second driving means for driving an optical member, which is any one of the light source, the second focusing means, and the aperture, within a plane perpendicular to a local optical axis accompanying the optical member; and control means for controlling the second driving means on the basis of a quantity of light received at each of the plural light reception regions of the detector.

According to this configuration, the first focusing means focuses light exiting from the light source onto an intended information layer in the optical recording medium. In this instance, the first driving means drives the first focusing means to focus light at a desired position within the information layer. Light thus focused passes through the optical recording medium and is then focused at the aperture position by passing through the second focusing means. Alternatively, light focused by the first focusing means is reflected on the optical recording medium in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region.

The control means controls the second driving means on the basis of a light quantity balance. In other words, the control means controls the second driving means so that a quantity of light received by the detector at each light reception region becomes equal. Light that passes through the aperture is thus adjusted to pass by the center of the aperture. As has been described, the need to include more than one light source and the like can be eliminated. The optical head according to an invention of the present application is thus compact and inexpensive, and yet capable of adjusting effectively the position of light that passes by the aperture.

(11) As has been described, an optical head according to an invention of the present application preferably includes: a light source; first focusing means for focusing light exiting from the light source onto an intended information layer in an optical recording medium formed by layering plural information layers; first driving means for driving the first focusing means within a plane perpendicular to an optical axis of light that passes through the first focusing means; second focusing means for focusing reflected light or transmitted light from the intended information layer; an aperture provided at a focusing point position of the second focusing means; a detector that receives light having passed by the aperture at plural light reception regions; a parallel plate provided between the second focusing means and the aperture; second driving means for tilting the parallel plate with respect to an optical axis of light that passes through the parallel plate; and control means for controlling the second driving means on the basis of a quantity of light received at each of the plural light reception regions of the detector.

According to this configuration, the first focusing means focuses light exiting from the light source onto an intended information layer in the optical recording medium. In this instance, the first driving means drives the first focusing means to focus light at a desired position within the information layer. Light thus focused passes through the optical recording medium and is then focused at the aperture position by passing through the second focusing means. Alternatively, light focused by the first focusing means is reflected on the recording medium in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region.

The control means controls the second driving means on the basis of the light quantity balance to tilt the parallel plate with respect to the optical axis of light that passes through the parallel plate in such a manner that a quantity of light received by the detector at each light reception region becomes equal. Light that passes through the aperture is thus adjusted to pass by the center of the aperture. As has been described, the need to include more than one light source and the like can be eliminated. The optical head according to an invention of the present application is thus compact and inexpensive, and yet capable of adjusting effectively the position of light that passes by the aperture.

(12) An optical head is the optical head set forth in (10) or (11) above, characterized in that the control means controls the first driving means in addition to the second driving means, and controls the first driving means according to a high frequency signal from the detector while controlling the second driving means according to a low frequency signal from the detector.

According to this configuration, the detector outputs a high frequency signal and a low frequency signal. The high frequency signal is chiefly a signal from pits recorded in the optical recording medium and the low frequency signal is chiefly a signal associated with the occurrence of a position displacement between the aperture and light that passes by the aperture. Hence, the control means controls the first driving means according to a high frequency signal from the detector, and aligns the position in the tracking direction, for example, by the phase difference method. Also, the control means controls the second driving means according to a low frequency signal from the detector to align the positions of the aperture and light that passes by the aperture. By using the high frequency signal and the low frequency signal properly in this manner, the optical head according to an invention of the present application becomes compact and inexpensive, and is yet capable of adjusting efficiently the position of light that comes incident on the optical recording medium as well as the position of light that passes by the aperture.

(13) As has been described, an optical head according to an invention of the present application preferably includes: a light source; first focusing means for focusing light exiting from the light source onto an intended information layer in an optical recording medium formed by layering plural information layers; first driving means for driving the first focusing means within a plane perpendicular to an optical axis of light that passes through the first focusing means; second focusing means for focusing reflected light or transmitted light from the intended information layer; an aperture provided at a focusing point position of the second focusing means; a detector that receives light having passed by the aperture at plural light reception regions; second driving means for driving an optical member, which is one of the second focusing means and the aperture, within a plane perpendicular to a local optical axis accompanying the optical member; third driving means for driving an optical member, which is one of the second focusing means and the aperture, in a direction parallel to the local optical axis; and control means for controlling the second and third driving means on the basis of a quantity of light received at each of the plural light reception regions of the detector.

According to this configuration, the first focusing means focuses light exiting from the light source onto an intended information layer in the optical recording medium. In this instance, the first driving means drives the first focusing means to focus light at a desired position within the information layer. Light thus focused passes through the optical recording medium and is then focused at the aperture position by passing through the second focusing means. Alternatively, light focused by the first focusing means is reflected on the optical recording medium in a specific direction and is then focused at the aperture position by passing through the second focusing means. In either case, light having passed by the aperture is received at the detector having plural light reception regions. Because the plural light reception regions receive light separately in this instance, it is possible to calculate a quantity of light received at each light reception region. A 2-D position of light that passes by the aperture can be therefore detected from a light quantity balance that indicates a magnitude relation of a quantity of light received at each light reception region.

The control means controls the second driving means on the basis of the light quantity balance to drive either the second focusing means or the aperture within a plane perpendicular to a local optical axis of the corresponding member in such a manner that a quantity of light received by the detector at each light reception region becomes equal. Further, the control means controls the third driving means, for example, in such a manner that a quantity of light received by the detector reaches the maximum to drive either the second focusing means or the aperture in a direction parallel to the local optical axis of the corresponding member. Light that passes through the aperture is thus adjusted to pass by the center of the aperture. As has been described, the need to include more than one light source and the like can be eliminated. The optical head according to an invention of the present application is thus compact and inexpensive, and yet capable of adjusting effectively the position of light that passes by the aperture.

(14) An optical head is the optical head set forth in (13) above, characterized in that the control means controls the first driving means in addition to the second and third driving means, and controls the first driving means according to a high frequency signal from the detector while controlling the second and third driving means according to a low frequency signal from the detector.

According to this configuration, the detector outputs a high frequency signal and a low frequency signal. The high frequency signal is chiefly a signal from pits recorded in the optical recording medium and the low frequency signal is chiefly a signal associated with the occurrence of a position displacement between the aperture and light that passes by the aperture. Hence, the control means controls the first driving means according to a high frequency signal from the detector, and aligns the position in the tracking direction, for example, by the phase difference method. Also, the control means controls the second and third driving means according to a low frequency signal from the detector to align the positions of the aperture and light that passes by the aperture in directions perpendicular to and parallel to the optical axis. By using the high frequency signal and the low frequency signal properly in this manner, the optical head according to an invention of the present application becomes compact and inexpensive, and is yet capable of adjusting efficiently the position of light that comes incident on the optical recording medium as well as the position of light that passes by the aperture.

(15) An optical head is the optical head set forth in any one of (10) through (14) above, wherein it is preferable that the aperture has a pin hole and the detector has four divided light reception regions.

In a case where the light reception region of the detector is made of one region, when the magnitude of a displacement of light that passes by the pin hole from the center of the pin hole is equal, a quantity of received light is equal regardless of the direction of the displacement. It is therefore impossible to detect the direction of the displacement. Hence, for example, the light reception region is divided into two in the vertical direction and two in the horizontal direction to pass the center of the light reception region, that is, it is divided into four regions in total. In this case, a 2-D position of light that passes by the pin hole can be detected from a balance of quantities of light received at the four light reception regions. A manner by which the region is divided into four regions is not limited to the manner described above. A dividing direction is not limited to the vertical and horizontal directions, either, and it can be an arbitrary direction. Further, the divided light reception regions may be of different sizes as long as the 2-D position of light that passes by the pin hole can be detected from a balance of quantities of light.

(16) An optical head is the optical head set forth in any one of (10) through (15) above, wherein it is preferable that the first focusing means and the second focusing means are one and the same.

According to this configuration, the first focusing means focuses light exiting from the light source onto the optical recording medium. Light thus focused is reflected on the optical recording medium and is then focused at the aperture position by passing through the first focusing means again. In other words, because the first focusing means also plays a role of the second focusing means, not only can the device be compact, but also the manufacturing costs can be saved by reducing the number of components.

(17) As has been described, an optical information processor according to an invention of the present application preferably includes the optical head according to any one of (10) through (16) above, and a driving mechanism that drives the optical recording medium. According to this configuration, it is possible to achieve an optical information processor that has a satisfactory playback performance due to a small interlayer cross talk and remains unsusceptible to a change in ambient temperature.

(18) As has been described, a confocal optical system aperture position detecting method according to an invention of the present application preferably includes: a first focusing step of focusing light exiting from a light source onto a sample; a second focusing step of focusing light having passed through the sample or light reflected on the sample; a light detecting step of receiving light having passed by an aperture provided at a focusing point position in the second focusing step at plural light reception regions; and a position detecting step of detecting a position displacement between the light and the aperture by detecting a position of a dark portion which is a region where luminance is lower than its surroundings in the light reception regions and generated when part of light focused in the second focusing step is shielded by the aperture while the light passes by the aperture in the light detecting step.

According to this configuration, light exiting from the light source is focused onto the sample, for example, an optical recording medium, in the first focusing step. Light thus focused passes through the sample and is then focused at the aperture position in the second focusing step. Alternatively, light focused in the first focusing step is reflected on the sample in a specific direction and is then focused at the aperture position in the second focusing step. In either case, light having passed by the aperture is received at the plural light reception regions. Because light having passed by the aperture is received at the plural light reception regions separately in the light detecting step, it is possible to calculate a quantity of light received at each light reception region. In this embodiment, the position of a dark portion generated on the light reception region as part of the light is shielded by the aperture is detected in the position detecting step. In this position detecting step, the position of the dark portion is detected on the basis of a light quantity balance that indicates a magnitude relation of a quantity of light received at each light reception region. It is thus possible to efficiently detect a 2-D position of light that passes by the aperture.

(19) As has been described, a confocal optical system aperture position detecting method according to an invention of the present application preferably includes: a first focusing step of focusing light exiting from a light source onto a sample; a second focusing step of focusing light having passed through the sample or light reflected on the sample; a light detecting step of receiving light having passed by an aperture provided at a focusing point position in the second focusing step at plural light reception regions; and a position detecting step of detecting a position displacement between the light and the aperture by detecting a position of an asymmetric pattern of a quantity of light generated when light focused in the second focusing step is scattered by the aperture while the light passes by the aperture in the light detecting step.

According to this configuration, light exiting from the light source is focused onto the sample, for example, an optical recording medium, in the first focusing step. Light thus focused passes through the sample and is then focused at the aperture position in the second focusing step. Alternatively, light focused in the first focusing step is reflected on the sample in a specific direction and is then focused at the aperture position in the second focusing step. In either case, light having passed by the aperture is received at plural light reception regions. Because light having passed by the aperture is received at the plural light reception regions separately in the light detecting step, it is possible to calculate a quantity of light received at each light reception region. In this embodiment, the position of an asymmetric pattern of a quantity of light generated as light is scattered by the aperture is detected in the position detecting step. In the position detecting step, the position of the dark portion is detected on the basis of a light quantity balance that indicates a magnitude relation of a quantity of light received at each light reception region. It is thus possible to detect efficiently a 2-D position of light that passes by the aperture.

While the invention has been described in detail, the descriptions above are only illustrative in all aspects, and the invention is not limited to these descriptions. It is therefore understood that a number of modifications that are not described herein can be anticipated without deviating from the scope of the invention.

INDUSTRIAL APPLICABILITY

The confocal optical system aperture position detector and the confocal optical system aperture position controller of the invention are capable of suppressing a position displacement of the aperture caused by a change in ambient temperature, and are therefore useful as an optical system in a biological microscope, an industrial microscope, etc.

The optical head and the optical information processor of the invention are useful as a memory drive for a computer and a drive for videos.

The invention claimed is:

1. A confocal optical system aperture position detector, comprising:
   a light source;
   first focusing means for focusing light exiting the light source onto a sample;
   second focusing means for focusing, at a focusing point position, light having passed through the sample or light reflected from the sample;
   an aperture provided at the focusing point position of the second focusing means; and
   a detector that receives light having passed by the aperture, the detector including a plurality of light reception regions and receiving the light at the plurality of light reception regions,
   wherein the detector measures a light quantity balance of the light received at the plurality of light reception regions to detect a position displacement between the light focused at the focusing point position by the second focusing means and the aperture.

2. The confocal optical system aperture position detector according to claim 1, wherein the plurality of light reception regions of the detector are divided to detect a 2-D position of the light that passes by the aperture.

3. The confocal optical system aperture position detector according to claim 1, wherein the aperture includes a pin hole and the detector includes four divided light reception regions.

4. The confocal optical system aperture position detector according to claim 1, wherein a material of the aperture is an electrical conductor.

5. The confocal optical system aperture position detector according to claim 1, wherein the first focusing means and the second focusing means are one and the same.

6. A confocal optical system aperture position controller comprising:
   a light source;
   first focusing means for focusing light exiting the light source onto a sample;
   second focusing means for focusing, at a focusing point position, light having passed through the sample or light reflected from the sample;
   an aperture provided at the focusing point position of the second focusing means;
   a detector that receives light having passed by the aperture, the detector including a plurality of reception regions and receiving the light at the plurality of light reception regions;
   driving means for driving an optical member, which is one of the light source, the second focusing means, and the aperture, within a plane perpendicular to a local optical axis accompanying the optical member; and
   control means for controlling the driving means based on a quantity of light received at each light reception region of the plurality of light reception regions of the detector,
   wherein the detector measures a light quantity balance of the light received at the plurality of light reception regions to detect a position displacement between the light focused at the focusing point position by the second focusing means and the aperture, and
   wherein the control means controls the driving means based on the position displacement detected by the detector.

7. The confocal optical system aperture position controller according to claim 6, wherein:
   the driving means is a first driving means;
   the confocal optical system aperture position controller further comprises second driving means for driving another optical member, which is one of the light source, the second focusing means, and the aperture, in a direction parallel to a local optical axis accompanying the another optical member; and
   the control means controls the first driving means and the second driving means based on the quantity of light received at each light reception region of the plurality of light reception regions of the detector.

8. The confocal optical system aperture position controller according to claim 6, wherein the first focusing means and the second focusing means are one and the same.

9. A confocal optical system aperture position controller comprising:
   a light source;
   first focusing means for focusing light exiting the light source onto a sample;
   second focusing means for focusing, at a focusing point position, light having passed through the sample or light reflected from the sample;
   an aperture provided at the focusing point position of the second focusing means;
   a detector that receives light having passed by the aperture, the detector including a plurality of light reception regions and receiving the light at the plurality of light reception regions;
   a parallel plate provided between the second focusing means and the aperture;
   driving means for tilting the parallel plate with respect to an optical axis of light that passes through the parallel plate; and
   control means for controlling the driving means based on a quantity of light received at each light reception region of the plurality of light reception regions of the detector,
   wherein the detector measures a light quantity balance of the light received at the plurality of light reception regions to detect a position displacement between the light focused at the focusing point position by the second focusing means and the aperture, and
   wherein the control means controls the driving means based on the position displacement detected by the detector.

10. An optical head comprising:
    a light source;
    first focusing means for focusing light exiting the light source onto an intended information layer of an optical recording medium formed by layering plural information layers;
    first driving means for driving the first focusing means within a plane perpendicular to an optical axis of light that passes through the first focusing means;
    second focusing means for focusing, at a focusing point position, reflected light or light transmitted from the intended information layer;
    an aperture provided at the focusing point position of the second focusing means;
    a detector that receives light having passed by the aperture, the detector including a plurality of light reception regions and receiving the light at the plurality of light reception regions;
    second driving means for driving an optical member, which is one of the light source, the second focusing means, and the aperture, within a plane perpendicular to a local optical axis accompanying the optical member; and control means for controlling the second driving means based on a quantity of light received at each light reception region of the plurality of light reception regions of the detector, wherein the detector measures a light quantity balance of the light received at the plurality of light reception regions to detect a position displacement between the light focused at the focusing point position by the second focusing means and the aperture, and wherein the control means controls the second driving means based on the position displacement detected by the detector.

11. The optical head according to claim 10, wherein the control means controls the first driving means according to a high frequency signal obtained from the detector and controls the second driving means according to a low frequency signal obtained from the detector.

12. The optical head according to claim 10, wherein the aperture includes a pin hole and the detector includes four divided light reception regions.

13. The optical head according to claim 10, wherein the first focusing means and the second focusing means are one and the same.

14. An optical information processor comprising:
the optical head according to claim 10; and
a driving mechanism that drives the optical recording medium.

15. An optical head comprising:
a light source;
first focusing means for focusing light exiting the light source onto an intended information layer of an optical recording medium formed by layering plural information layers;
first driving means for driving the first focusing means within a plane perpendicular to an optical axis of light that passes through the first focusing means;
second focusing means for focusing, at a focusing point position, reflected light or light transmitted from the intended information layer;
an aperture provided at the focusing point position of the second focusing means;
a detector that receives light having passed by the aperture, the detector including a plurality of light reception regions and receiving the light at the plurality of light reception regions;
a parallel plate provided between the second focusing means and the aperture;
second driving means for tilting the parallel plate with respect to an optical axis of light that passes through the parallel plate; and
control means for controlling the second driving means based on a quantity of light received at each light reception region of the plurality of light reception regions of the detector,
wherein the detector measures a light quantity balance of the light received at the plurality of light reception regions to detect a position displacement between the light focused at the focusing point position by the second focusing means and the aperture, and
wherein the control means controls the second driving means based on the position displacement detected by the detector.

16. An optical head comprising:
a light source;
first focusing means for focusing light exiting the light source onto an intended information layer of an optical recording medium formed by layering plural information layers;
first driving means for driving the first focusing means within a plane perpendicular to an optical axis of light that passes through the first focusing means;
second focusing means for focusing, at a focusing point position, reflected light or light transmitted from the intended information layer;
an aperture provided at the focusing point position of the second focusing means;
a detector that receives light having passed by the aperture, the detector including a plurality of light reception regions and receiving the light at the plurality of light reception regions;
second driving means for driving an optical member, which is one of the second focusing means and the aperture, within a plane perpendicular to a local optical axis accompanying the optical member;
third driving means for diving another optical member, which is one of the second focusing means and the aperture, in a direction parallel to the local optical axis; and
control means for controlling the second driving means and the third driving means based on a quantity of light received at each light reception region of the plurality of light reception regions of the detector,
wherein the detector measures a light quantity balance of the light received at the plurality of light reception regions to detect a position displacement between the light focused at the focusing point position by the second focusing means and the aperture, and
wherein the control means controls the second driving means and the third driving means based on the position displacement detected by the detector.

17. The optical head according to claim 16, wherein the control means controls the first driving means according to a high frequency signal obtained from the detector and controls the second driving means and the third driving means according to a low frequency signal obtained from the detector.

18. A confocal optical system aperture position detecting method comprising:
a first focusing step of focusing light exiting a light source onto a sample;
a second focusing step of focusing, at a focusing point position, light having passed through the sample or light reflected from the sample;
a light detecting step of receiving light focused in the second focusing step and having passed by an aperture provided at the focusing point position, the light received by the light detecting step being received at a plurality of light reception regions; and
a position detecting step of detecting a position displacement between the light focused at the focusing point position by the second focusing step and the aperture by detecting a position of a dark portion, which is (i) a region where luminance is lower than its surroundings in the plurality of light reception regions, and (ii) generated when a part of the light focused at the focusing point position by the second focusing step is shielded by the aperture while the light passes by the aperture in the light detecting step.

19. A confocal optical system aperture position detecting method comprising:

a first focusing step of focusing light exiting a light source onto a sample;

a second focusing step of focusing, at a focusing point position, light having passed through the sample or light reflected from the sample;

a light detecting step of receiving light focuses in the second focusing step and having passed by an aperture provided at the focusing point position, the light received by the light detecting step being received at a plurality of light reception regions; and a position detecting step of detecting a position displacement between the light focused at the focusing point position by the second focusing step and the aperture by detecting a position of an asymmetric pattern of a quantity of light generated when the light focused at the focusing point position by the second focusing step is scattered by the aperture while the light passes by the aperture in the light detecting step.

* * * * *